(12) United States Patent
Maguire et al.

(10) Patent No.: US 10,243,807 B2
(45) Date of Patent: Mar. 26, 2019

(54) OPERATIONAL LIFETIME OF COMMUNICATION NETWORK NODES

(71) Applicant: Telefonaktiebolaget LM Ericsson (publ), Stockholm (SE)

(72) Inventors: Patrick Maguire, Westmeath (IE); John Quilty, Westmeath (IE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 144 days.

(21) Appl. No.: 15/314,995

(22) PCT Filed: Jun. 3, 2014

(86) PCT No.: PCT/EP2014/061461
§ 371 (c)(1),
(2) Date: Nov. 30, 2016

(87) PCT Pub. No.: WO2015/185108
PCT Pub. Date: Dec. 10, 2015

(65) Prior Publication Data
US 2017/0207981 A1 Jul. 20, 2017

(51) Int. Cl.
*H04L 12/24* (2006.01)
*H04W 24/04* (2009.01)
*H04L 12/26* (2006.01)

(52) U.S. Cl.
CPC ........ *H04L 41/147* (2013.01); *H04L 41/0677* (2013.01); *H04L 41/5009* (2013.01); *H04L 43/08* (2013.01); *H04W 24/04* (2013.01)

(58) Field of Classification Search
CPC .......... A61M 5/31551; A61M 5/31583; G06F 19/00; H04L 41/0677; H04L 41/147; H04L 41/5009; H04L 43/08; H04W 24/04
(Continued)

(56) References Cited

U.S. PATENT DOCUMENTS 6,618,504 B1 * 9/2003 Yoshino ............. G06K 9/00449
382/187
7,024,335 B1 4/2006 Parlos
(Continued)

OTHER PUBLICATIONS

An Artificial Neural Network Approach for Remaining Useful Life Prediction of Equipments Subject to Condition Monitoring by Zhigang Tian; Concordia Institute for Information Systems Engineering, Concordia University, Montreal, Quebec, H3G 2W1, Canada— 2009 IEEE.
(Continued)

*Primary Examiner* — Mark H Rinehart
*Assistant Examiner* — Kokou R Detse
(74) *Attorney, Agent, or Firm* — Sage Patent Group

(57) ABSTRACT

A method for predicting operational lifetime of a node in a communication network is disclosed. The method comprises obtaining an expected operational lifetime for the node (22), monitoring at least one of hardware identification data, operational data or operating environment data for the node (24), obtaining historical failure data for a subset of nodes in the communication network having monitored data corresponding to the monitored data of the node (26) and adjusting the expected operational lifetime for the node according to the obtained historical failure data (28). Also disclosed are a computer program product for carrying out the above method and a network element (500, 600) configured to carry out the above method.

16 Claims, 14 Drawing Sheets

(58) Field of Classification Search
USPC .......................................................... 370/242
See application file for complete search history.

(56) References Cited

U.S. PATENT DOCUMENTS

| | | | | |
|---|---|---|---|---|
| 2003/0048223 | A1* | 3/2003 | Kezys | H01Q 3/26 |
| | | | | 342/368 |
| 2008/0140352 | A1 | 6/2008 | Goebel et al. | |
| 2008/0250265 | A1* | 10/2008 | Chang | G06F 11/008 |
| | | | | 714/4.12 |
| 2012/0011517 | A1* | 1/2012 | Smith | G06F 11/3006 |
| | | | | 718/104 |
| 2014/0053014 | A1* | 2/2014 | MacQuarrie | G06F 11/0793 |
| | | | | 714/4.2 |
| 2015/0316618 | A1* | 11/2015 | Lou | G01R 31/3693 |
| | | | | 702/63 |

OTHER PUBLICATIONS

International Search Report for International application No. PCT/EP2014/061461—dated Feb. 25, 2015.

* cited by examiner

OPERATIONAL LIFETIME OF COMMUNICATION NETWORK NODES

PRIORITY

This nonprovisional application is a U.S. National Stage Filing under 35 U.S.C. § 371 of International Patent Application Serial No. PCT/EP2014/061461, filed Jun. 3, 2014, and entitled "Operational Lifetime of Communication Network Nodes."

TECHNICAL FIELD

The present invention relates to a method and apparatus for predicting operational lifetime of a node in a communication network. The invention also relates to a computer program product configured, when run on a computer, to carry out a method for predicting operational lifetime of a node in a communication network.

BACKGROUND

Cellular communications networks continue to experience rapid growth, with the volume of data traffic in mobile broadband in particular increasing exponentially. Unlike in the early days of mobile telephony, over 70% of cellular communication network usage today is indoor, and with the global population becoming increasingly urbanised, indoor cellular network use is also set to increase. The provision of consistent and reliable indoor network coverage via conventional macro cells is inherently challenging, and when investigating those users whom macro cells have difficulties serving, it can be found that almost 100% of such "problem" users in urban areas are located indoors.

The primary network solution for providing reliable indoor network coverage is the deployment of Low Power Nodes (LPNs), including small cells and Distributed Antenna System (DAS) networks. LPNs transmit at signal power levels that are considerably lower than those used in macro cells, and are physically much smaller. LPNs are therefore deployed within indoor environments to provide network coverage in areas where macro cells are unable to meet network demand. Small cells, including for example micro, pico and femto cells, are typically used in an ad hoc deployment to provide coverage and/or capacity extension in relatively small areas. Small cells usually support a single wireless technology and carrier, and provide a relatively immediate solution to small scale capacity or coverage problems.

DAS networks may represent a larger investment, both financially and in the planning and design of their deployment, however DAS networks offer a more robust, flexible and scalable solution for addressing a large range of coverage and capacity issues in indoor/semi-indoor environments. DAS networks can accommodate multiple frequencies and wireless technologies for different wireless carriers and are one of the primary solutions for network coverage in medium to large indoor environments.

FIGS. 1 and 2 illustrate an example DAS network configuration and deployment. Referring to FIG. 1, a DAS network 2 comprises an indoor hub 4 having a backhaul connection to a macro network cell (not shown). Within the hub is located a Digital Unit 6 providing centralised digital baseband and an Indoor Radio Unit 8. The hub 4 may support multiple Active Antenna Elements (AAEs), also known as Active Antenna Heads or Radio Heads (RHs) 10 which have a wired connection to the IRU of the hub and transmit and receive radio signals. In some deployments, as shown in FIG. 2, the IRU 8 of the hub 4 may be distributed as multiple IRUs 8 deployed on individual floors or in individual segments of a building, each distributed IRU 8 supporting multiple AAEs 10. In very large venues or campuses, centralised baseband may also be shared over multiple Digital Units 6, each cooperating with multiple IRUs and with each IRU supporting multiple AAEs.

A DAS network as illustrated in FIGS. 1 and 2 may comprise many tens of thousands of AAEs deployed across multiple floors of multiple buildings. Managing such large DAS networks to ensure service provision in a cost effective manner while ensuring compliance with customer Service Level Agreements (SLAs) is a complicated task. Typically, when a fault is reported on an AAE, an alarm is received by the network management function of the DAS network operator. The network management function will then arrange for the faulty AAE to be replaced through its standard repair and service fulfillment procedures. This will generally involve arranging access to the building where the AAE is located and scheduling a visit from appropriate personnel to replace the AAE. During this time, the AAE will remain out of service, reducing the network coverage and capacity offered by the DAS network.

AAEs have a finite operating lifetime, meaning that hardware upgrades and hardware failures are a part of normal business operations. As the scale and complexity of a DAS network increases, with large volumes of antenna heads located in different buildings over multiple floors, possibly supporting multiple customers with differently tailored SLAs, the task of managing equipment lifecycle while meeting SLAs and maintaining operating expenses at an acceptable level becomes increasingly challenging.

SUMMARY

It is an aim of the present invention to provide a method and apparatus which obviate or reduce at least one or more of the disadvantages mentioned above.

According to a first aspect of the present invention, there is provided a method for predicting operational lifetime of a node in a communication network, the method comprising obtaining an expected operational lifetime for the node, monitoring at least one of hardware identification data, operational data or operating environment data for the node, obtaining historical failure data for a subset of nodes in the communication network having monitored data corresponding to the monitored data of the node, and adjusting the expected operational lifetime for the node according to the obtained historical failure data.

In some examples, the historical failure data may comprise stored monitored data for nodes in the communication network that have failed, and may also comprise actual and expected operational lifetimes for nodes in the communication network that have failed.

In some examples, adjusting the expected operational lifetime for the node according to the obtained historical failure data may comprise applying a machine learning algorithm to predict an expected operational lifetime for the node on the basis of an actual operational lifetime of nodes in the subset.

In some examples, the expected operational lifetime for the node may comprise a default operational lifetime or a previously adjusted expected operational lifetime. A default operational lifetime may for example be a manufacturer's default operational lifetime, and may be used for nodes newly installed in the communication network.

In some examples, operational data for the node may comprise at least one of peak data rate, average data rate, power spikes or power interruptions.

In further examples, operating environment data for the node may comprise at least one of average environment temperature or rate of change of environment temperature.

In further examples, the hardware identification data may comprise make and model of the node.

In some examples, the method may comprise monitoring combinations of operational and operating environment data, for example environment temperature during times of peak data rate.

In some examples, monitoring operational environment data may comprise subscribing to sensor data associated with the nodes of the communication network, and/or may comprise subscribing to data from operational and/or environment management systems within or outside the communication network.

In some examples, the method may further comprise clustering nodes in the network according to monitored data and, for each cluster, generating a predicted variation of each monitored data for nodes within the cluster. In further examples, clustering may additionally be performed on the basis of expected operational lifetime.

In some examples, the method may further comprise, on receipt of monitored data for a node, storing the received monitored data and comparing the received monitored data to the predicted variation for the node's cluster. If the received monitored data is not within the predicted variation for the node's cluster, the method may further comprise adjusting the predicted variation for the node's cluster according to the received monitored data and assessing whether the change in predicted variation of monitored data will impact the expected operational lifetime of nodes within the cluster.

In some examples, "impact" may comprise causing a change in the expected operational lifetime that is greater than a threshold margin, which may be a magnitude or percentage margin. In further examples, if the received monitored data is within the predicted variation for the node's cluster, then the method may further comprise resuming monitoring of data for nodes in the network.

In some examples, the method may further comprise, if the assessment indicates that the change in predicted variation of monitored data will impact the expected operational lifetime of nodes within the cluster, determining at least one of a location or a hardware data which is associated with the received monitored data that was outside the predicted variation for the node's cluster, identifying nodes in the communication network sharing the determined location or hardware data, and adjusting the expected operational lifetime for the identified nodes according to the received monitored data.

In some examples, the method may further comprise, on failure of a network node, determining a cause of the failure based on monitored data for the node, and calculating a disparity between actual operational lifetime of the failed node and expected operational lifetime of the failed node. In some examples, the disparity in operational lifetime may comprise a percentage difference of the actual operational lifetime above or below the expected operational lifetime.

In some examples, the method may further comprise, if the calculated disparity is above a threshold, identifying the monitored data corresponding to the determined cause of failure, determining at least one of a location or a hardware data which is associated with the identified monitored data, identifying nodes in the communication network sharing the determined location or hardware data, and adjusting the expected operational lifetime for the identified nodes according to the identified monitored data.

In some examples, the threshold may be a threshold for statistical significance; and may indicate whether the disparity is likely to be caused by a factor related to monitored data which was taken into account in adjusting of the expected operational lifetime of the failed node, or by another, non monitored factor. The threshold for statistical significance may be set according to the relation of the calculated disparity to an acceptable margin of error for the expected operational lifetime.

In some examples, the method may further comprise, if the calculated disparity is not above a threshold, performing pattern analysis on historical failure data for nodes including the failed node for data correlating with the failure of the node.

In such examples, the method may further comprise, if the pattern analysis identifies a correlation, adding the data associated with the correlation to the monitored data for nodes remaining in the network.

In some examples, the method may further comprise, following adjustment of an expected operational lifetime for a node, checking the adjusted expected operational lifetime against at least one of a Service Level Agreement or a Hardware Replacement Policy, and signalling a breach of Service Level Agreement or Hardware Replacement Policy caused by the adjusted expected operational lifetime.

In some examples, the node may comprise a Low Power Node and may comprise an Active Antenna Element in a Distributed Antenna System.

According to another aspect of the present invention, there is provided a method for managing replacement of nodes in a communication network, the method comprising predicting operational lifetime of the nodes in the communication network according to a method of the first aspect of the present invention, calculating a probability of operational lifetime of nodes in the communication network falling within a time period, and identifying nodes for which the probability of operational lifetime falling within the time period is above a threshold.

In some examples, the time period may be the time period between an upcoming maintenance visit and the following maintenance visit, and the method may thus permit a decision to be taken on pre-emptive replacement of identified nodes at the upcoming maintenance visit. The probability threshold may be set according to a Service Level Agreement and/or Hardware Replacement Policy of a user of the network.

According to another aspect of the present invention, there is provided a computer program product configured, when run on a computer, to carry out a method according to the above aspects of the present invention.

According to another aspect of the present invention, there is provided a network element configured to predict operational lifetime of a node in a communication network, the network element comprising a discovery unit, configured to obtain an expected operational lifetime for the node, a monitoring unit configured to monitor at least one of hardware identification data, operational data or operating environment data for the node, and a lifetime unit configured to obtain historical failure data for nodes in the communication network having monitored data corresponding to the monitored data of the node, and to adjust the expected operational lifetime for the node according to the obtained historical failure data.

In some examples, the lifetime unit may be configured to adjust the expected operational lifetime for the node according to the obtained historical failure data by applying a machine learning algorithm to predict an expected operational lifetime for the node on the basis of an actual operational lifetime of nodes in the subset.

In some examples, the lifetime unit may be further configured to cluster nodes in the network according to monitored data and, for each cluster, generate a predicted variation of each monitored data for nodes within the cluster.

In some examples, on receipt of monitored data, the monitoring unit may be further configured to store the received monitored data in a storage unit and compare the received monitored data to the predicted variation for the node's cluster. In such examples, if the received monitored data is not within the predicted variation for the node's cluster, the lifetime unit may be further configured to adjust the predicted variation for the node's cluster according to the received monitored data and assess whether the change in predicted variation of monitored data will impact the expected operational lifetime of nodes within the cluster.

According to another aspect of the present invention, there is provided an apparatus configured to manage replacement of nodes in a communication network, the apparatus comprising: a network element according to the above aspect of the present invention, a calculating unit configured to calculate a probability of operational lifetime of nodes in the communication network falling within a time period, and an identifying unit configured to identify nodes for which the probability of operational lifetime falling within the time period is above a threshold.

According to another aspect of the present invention, there is provided a network element configured to predict operational lifetime of a node in a communication network, the network element comprising a processor and a memory, the memory containing instructions executable by the processor whereby the network element is operative to obtain an expected operational lifetime for the node, monitor at least one of hardware identification data, operational data or operating environment data for the node, obtain historical failure data for nodes in the communication network having monitored data corresponding to the monitored data of the node, and adjust the expected operational lifetime for the node according to the obtained historical failure data.

In some examples, the network element may be further operative to adjust the expected operational lifetime for the node according to the obtained historical failure data by applying a machine learning algorithm to predict an expected operational lifetime for the node on the basis of an actual operational lifetime of nodes in the subset.

In some examples, the network element may be further operative to cluster nodes in the network according to monitored data and, for each cluster, generate a predicted variation of each monitored data for nodes within the cluster.

In some examples, on receipt of monitored data for a node, the network element may be further operative to store the received monitored data and compare the received monitored data to the predicted variation for the node's cluster. In such examples, if the received monitored data is not within the predicted variation for the node's cluster, the network element may be further operative to adjust the predicted variation for the node's cluster according to the received monitored data and assess whether the change in predicted variation of monitored data will impact the expected operational lifetime of nodes within the cluster.

In some examples, if the assessment indicates that the change in predicted variation of monitored data will impact the expected operational lifetime of nodes within the cluster, the network element may be further operative to determine at least one of a location or a hardware data which is associated with the received monitored data that was outside the predicted variation for the node's cluster, identify nodes in the communication network sharing the determined location or hardware data and adjust the expected operational lifetime for the identified nodes according to the received monitored data.

In some examples, on failure of a network node, the network element may be further operative to determine a cause of the failure based on monitored data for the node and calculate a disparity between actual operational lifetime of the failed node and expected operational lifetime of the failed node.

In some examples, if the calculated disparity is above a threshold, the network element may be further operative to identify the monitored data corresponding to the determined cause of failure, determine at least one of a location or a hardware data which is associated with the identified monitored data, identify nodes in the communication network sharing the determined location or hardware data, and adjust the expected operational lifetime for the identified nodes according to the identified monitored data.

In some examples, if the calculated disparity is not above a threshold, the network element may be further operative to perform pattern analysis on historical failure data for nodes including the failed node for data correlating with the failure of the node.

In some examples, if the pattern analysis identifies a correlation, the network element may be further operative to add the data associated with the correlation to the monitored data for nodes remaining in the network.

In some examples, following adjustment of an expected operational lifetime for a node, the network element may be further operative to check the adjusted expected operational lifetime against at least one of a Service Level Agreement or a Hardware Replacement Policy, and signal a breach of Service Level Agreement or Hardware Replacement Policy caused by the adjusted expected operational lifetime.

According to another aspect of the present invention, there is provided an apparatus configured to manage replacement of nodes in a communication network, the apparatus comprising a processor and a memory, the memory containing instructions executable by the processor whereby the apparatus is operative to predict operational lifetime of the nodes in the communication network according to a method of the first aspect of the present invention, calculate a probability of operational lifetime of nodes in the communication network falling within a time period, and identify nodes for which the probability of operational lifetime falling within the time period is above a threshold.

BRIEF DESCRIPTION OF THE DRAWINGS

For a better understanding of the present invention, and to show more clearly how it may be carried into effect, reference will now be made, by way of example, to the following drawings in which.

DETAILED DESCRIPTION

Aspects of the present invention provide a method for predicting operational lifetime of a node in a communication network. Aspects of the present invention additionally provide a method for managing replacement of nodes in a communication network, replacement being managed at least in part on the basis of operational lifetimes predicted according to the present invention. Aspects of the present invention thus facilitate the taking of decisions on pre-emptive equipment replacement based on accurate predictions of hardware operational lifetime. Operational lifetime may differ from manufacturer expectations for many reasons including the operational and operating environment conditions to which the hardware is exposed. For example, Active Antenna Elements (AAEs) may implement an energy efficient solution according to which the AAEs automatically power up and down based on traffic levels. Turning on and off the component results in voltage spikes, increasing frequency of which increases the likelihood of hardware failure. Aspects of the present invention enable such limiting factors to be taken into account in the accurate prediction of operational lifetime, so facilitating management of component lifecycle.

Figure 1:
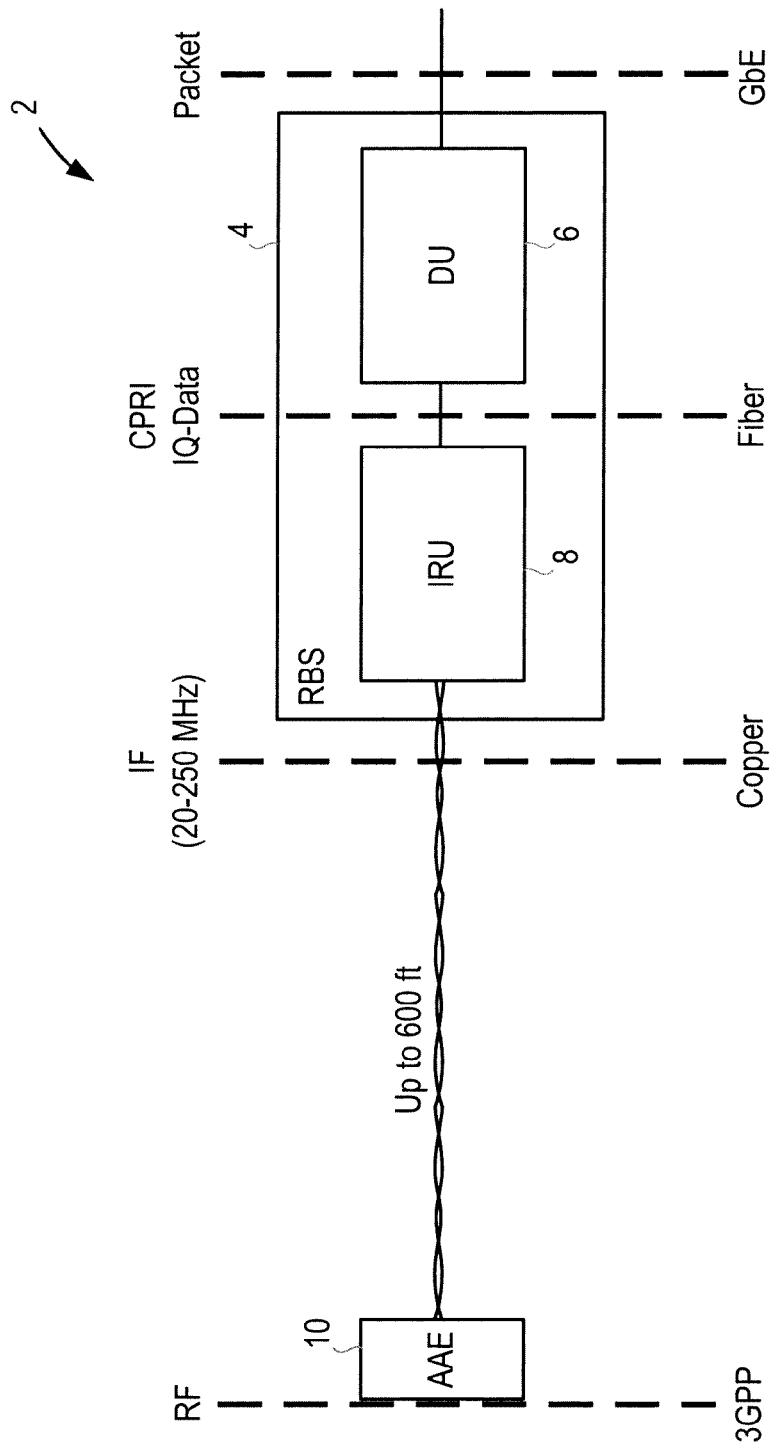
FIG. 1 illustrates an example Distributed Antenna System (DAS) configuration.
Figure 2:
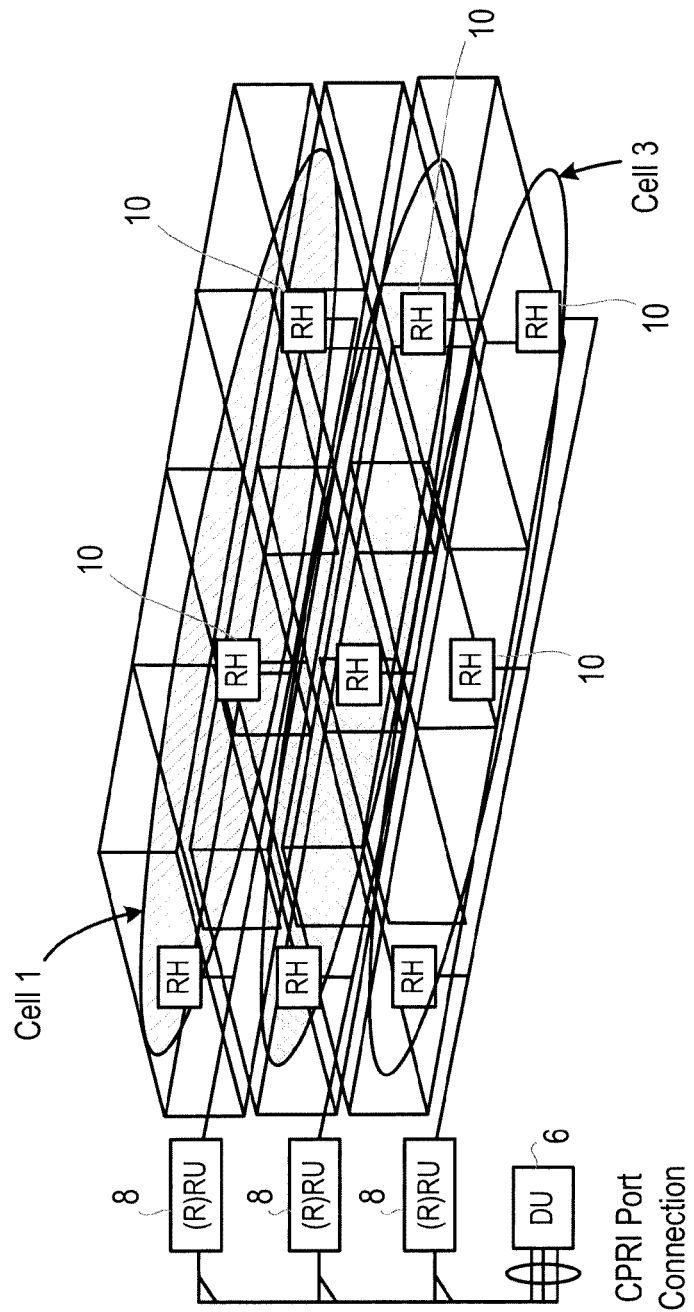
FIG. 2 illustrates an example Distributed Antenna System (DAS) deployment.
Figure 3:
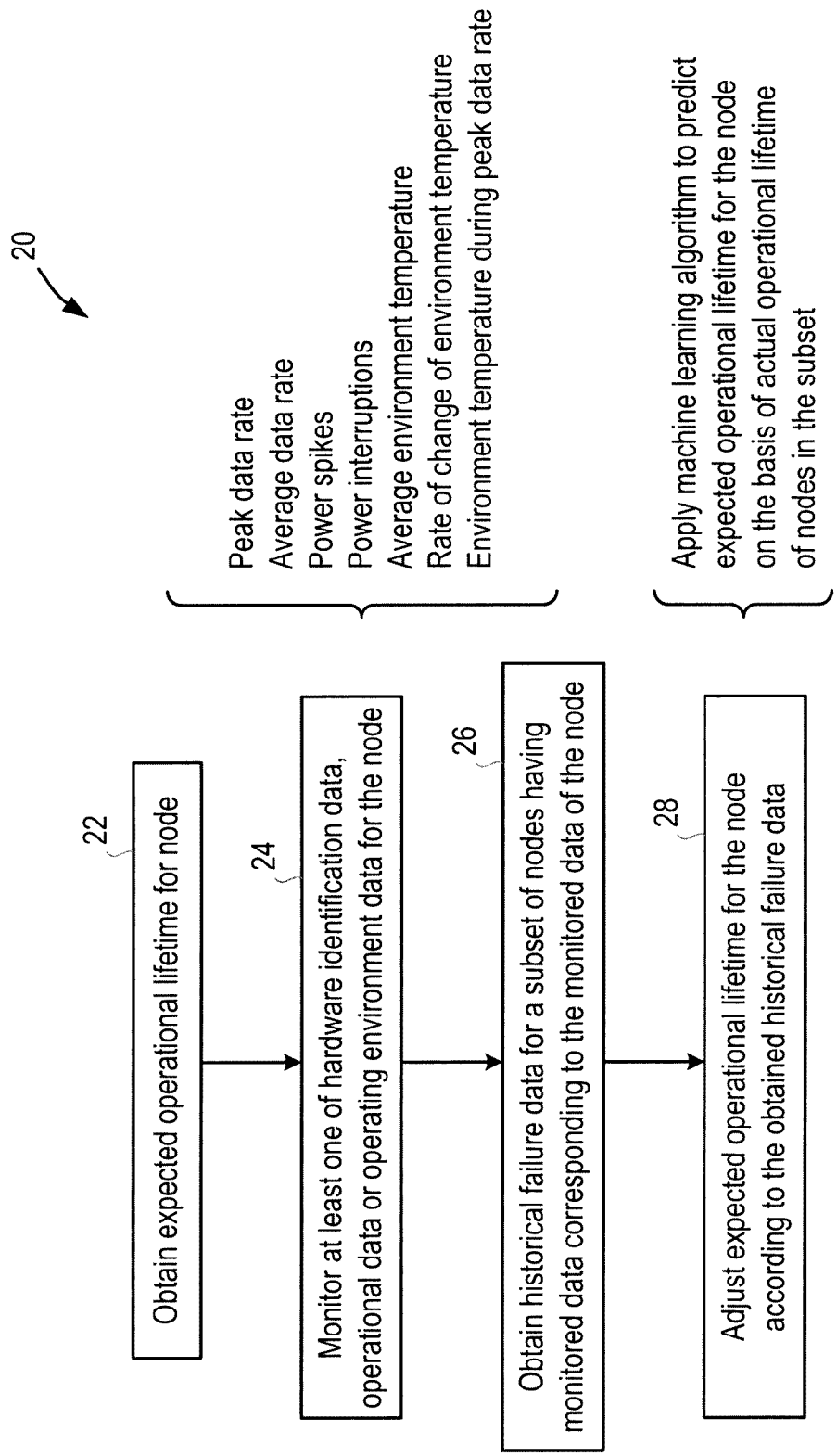
FIG. 3 is a flow chart illustrating process steps in a method for predicting operational lifetime of a node in a communication network.

FIG. 3 illustrates process steps in a method 20 for predicting operational lifetime of a node in a communication network in accordance with aspects of the present invention. The node may for example be a Low Power Node (LPN) which may include an Active Antenna Element (AAE), also known as an Active Antenna Head, or may include a Passive Antenna Element. The LPN may comprise a micro, pico or femtocell. The LPN may be part of a DAS network. Referring to FIG. 3, in a first step 22, the method comprises obtaining an expected operational lifetime for the node. The expected operational lifetime may in some examples be a default operational lifetime, such as that provided by the hardware manufacturer of the node. A default lifetime may for example be used on initial installation of a node, before a more accurate prediction is available. In other examples, the expected operational lifetime for the node may be a previously predicted operational lifetime, such as a default or previous expected operational lifetime that has already been adjusted at least once according to examples of the present method. The method of FIG. 3 may thus be used in an iterative manner, to provide an initial predicted operational lifetime on installation of a node, and then to update that predicted operational lifetime as new relevant data becomes available.

After obtaining an expected operational lifetime for the node at step 22, the method then comprises monitoring at least one of hardware identification data, operational data or operating environment data for the node at step 24. Hardware identification data may include make and model of the node's hardware, including manufacturer. Operational data may include peak data rate, average data rate, power spikes or power interruptions experienced in the node. Operational environment data may include average environment temperature at the node's location or rate of change of temperature at the node's location. In some examples, combinations of operational and operating environment data may be monitored, such as the environment temperature at the node's location during times of peak data rate experienced in the node. In some examples, monitoring operational environment data may comprise subscribing to sensor data associated with the nodes of the communication network, and/or may comprise subscribing to data from operational and/or environment management systems within or outside the communication network, which may be able to supply relevant operational environment data for a particular node. In other examples, nodes may be equipped with individual sensors providing operational environment data for the node.

The method further comprises, at step 26, obtaining historical failure data for a subset of nodes having monitored data corresponding to the monitored data for the node. Historical failure data for nodes may include stored monitored data for network nodes that have previously failed as well as actual and expected operational lifetimes for the failed nodes. Corresponding monitored data may include data having monitored values which are the same as, or within a predetermined margin of error of, the values for data of the node under consideration. In some examples, only certain monitored data for the node may be considered in identifying the subset of nodes for which historical failure data is obtained. The data to be taken into consideration may include the data most closely linked to the failure cause for the previously failed nodes. Thus in some examples, multiple subsets of previously failed nodes may be considered, each subset having at least one monitored data corresponding to monitored data for the node under consideration.

Having obtained the historical failure data for a subset of nodes having corresponding monitored data, the method then comprises, at step 28, adjusting the expected operational lifetime for the node, obtained at step 22, according to the historical failure data obtained at step 26. The adjustment may be performed by applying a machine learning algorithm to predict an expected operational lifetime for the node on the basis of the actual operational lifetimes of nodes in the subset. Thus, if the nodes in the subset had shorter operational lifetimes than originally expected, for example as a result of harsh operating conditions, then the node under consideration, which has been found on the basis of its monitored data to be experiencing similar harsh conditions, may have its predicted operational lifetime shortened.

The machine learning algorithm may for example be a prediction algorithm receiving node make and model and monitored operating and/or operational environment conditions for the node as inputs, and returning as output an expected operational lifetime for the node. The prediction algorithm may be developed on the basis of training data in the form of monitored data and actual operational lifetimes for failed nodes. This training data may be used to train the algorithm via iterative refinements until an accurate prediction of operational lifetime can be returned by the algorithm on the basis of the above mentioned inputs. The algorithm, once developed on the training data, may be applied to nodes in the network to perform the adjustment of the obtained expected operational lifetime by predicting a new expected operational lifetime. As conditions for a particular node evolve, the algorithm may be reapplied with the evolved inputs for the node, allowing the predicted operational lifetime to evolve with the changing conditions. In the event of a new node failure, the algorithm may be tested to see whether the predicted operational lifetime was accurate. If the predicted operational lifetime was not within a margin of error, a check may be made as to whether the data used for predicting the operational lifetime of the node was consistent with the actual monitored data for the node. If the data was consistent but still the predicted operational lifetime was outside a margin of error, the failed node may be treated as a new instance of training data, and be used to refine the prediction algorithm to more accurately reflect the underlying correlations between the various inputs and the actual operational lifetimes of the nodes.

Figure 4:
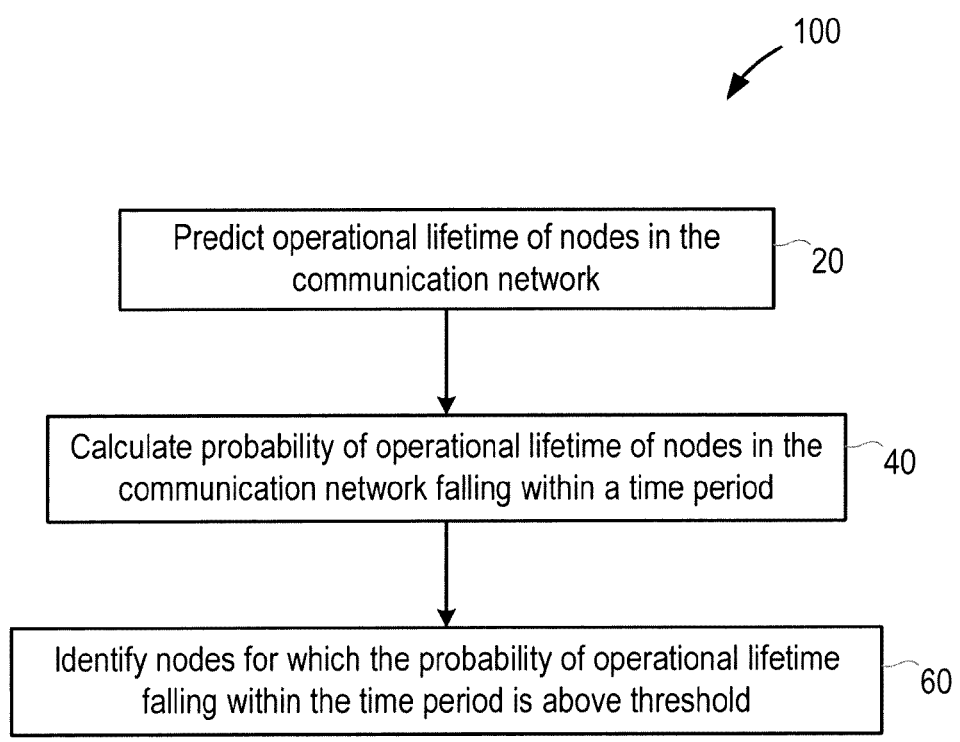
FIG. 4 is a flow chart illustrating process steps in a method for managing replacement of nodes in a communication network

The method of FIG. 3 for predicting operational lifetime of a node in a communication network may form a component part of a method 100 for managing replacement of nodes in a communication network, as illustrated in FIG. 4. Referring to FIG. 4, in a first step 20 of the method 100, operational lifetime of nodes in the communication network is predicted according to the method 20 described above. On the basis of the predicted operational lifetimes, the method 100 then comprises, in step 40, calculating the probability of operational lifetime of nodes in the communication network falling within a time period. The time period may be defined according to operational requirements but in one example the time period may be the time between an upcoming scheduled maintenance visit and the following scheduled maintenance visit. In this manner, step 40 of the method may result in calculating the probability of each node's predicted operational lifetime coming to an end in the period spanning the next two scheduled maintenance visits. Having calculated these probabilities, the method 100 then comprises, at step 60, identifying nodes for which the probability of operational lifetime falling within the time period is above a threshold value. The threshold value may set according to particular requirements for users of the communication network. The method may thus permit a decision to be taken as to pre-emotive replacement of the identified nodes during the next scheduled maintenance visit, in order to avoid the likely failure of the nodes and subsequent down time while waiting for the next scheduled visit, or the expense of arranging for an unscheduled maintenance visit. The probability thresholds may be set according to network user priorities. For user's requiring very high levels of network service and reliability, the probability thresholds may be set relatively low, ensuring that nodes are pre-emptively replaced well before they may be expected to fail. For users requiring a balance of cost effectiveness against hardware reliability, a higher threshold may be set, accepting a higher possibility of node failure before pre-emptive replacement in return for the reduced operational costs when compared with the cost associated with a high level of pre-emptive replacements.

The method for predicting operational lifetime of a node as illustrated in FIG. 3 may thus enable dynamic management of communication networks, enabling network operators and users to balance minimised node downtime against operational cost in a manner tailored to individual user requirements.

Figure 5A:
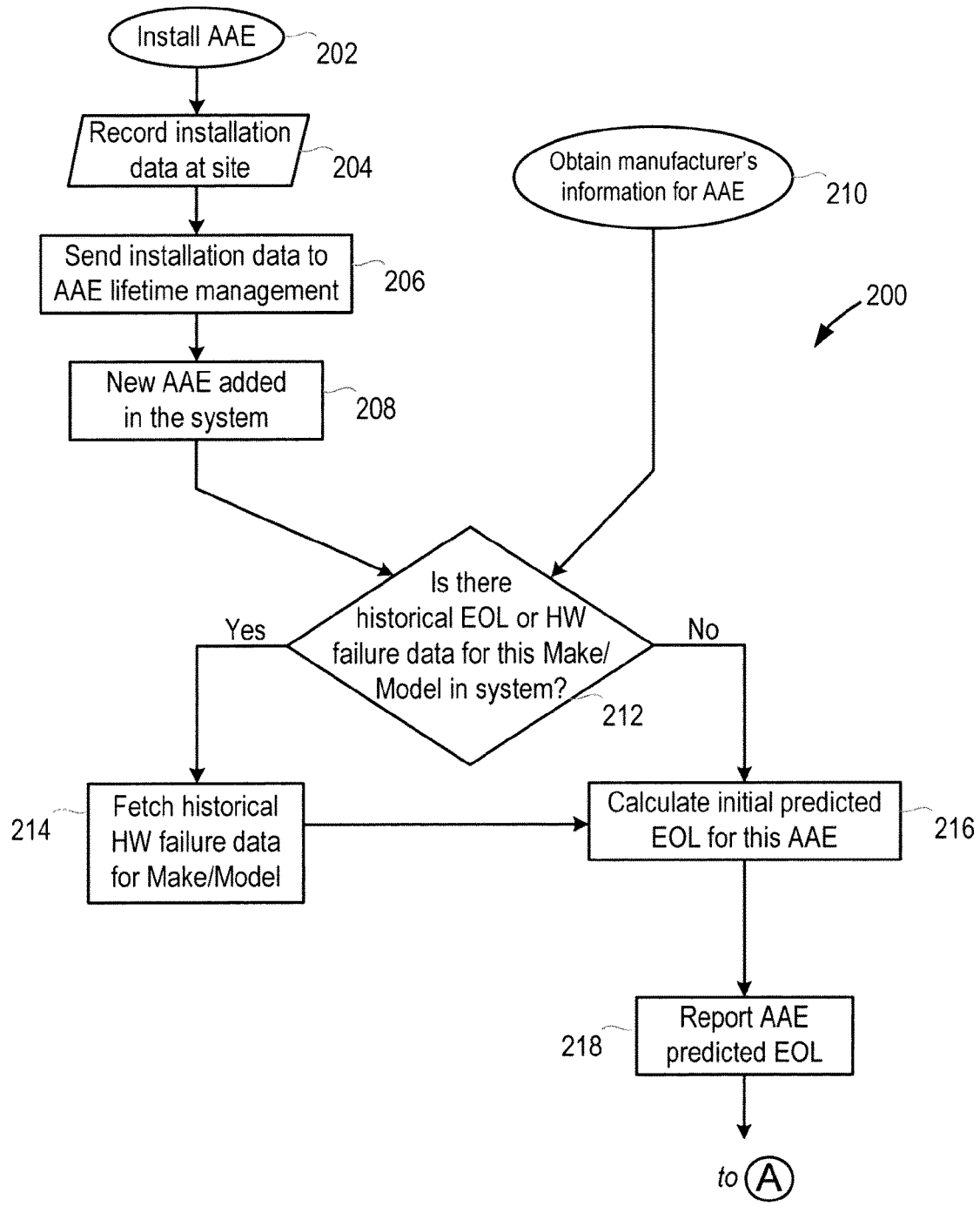
FIGS. 5a and 5b is a flow chart illustrating an example installation process for a node in a communication network, according to the method of FIG. 3.
Figure 5B:
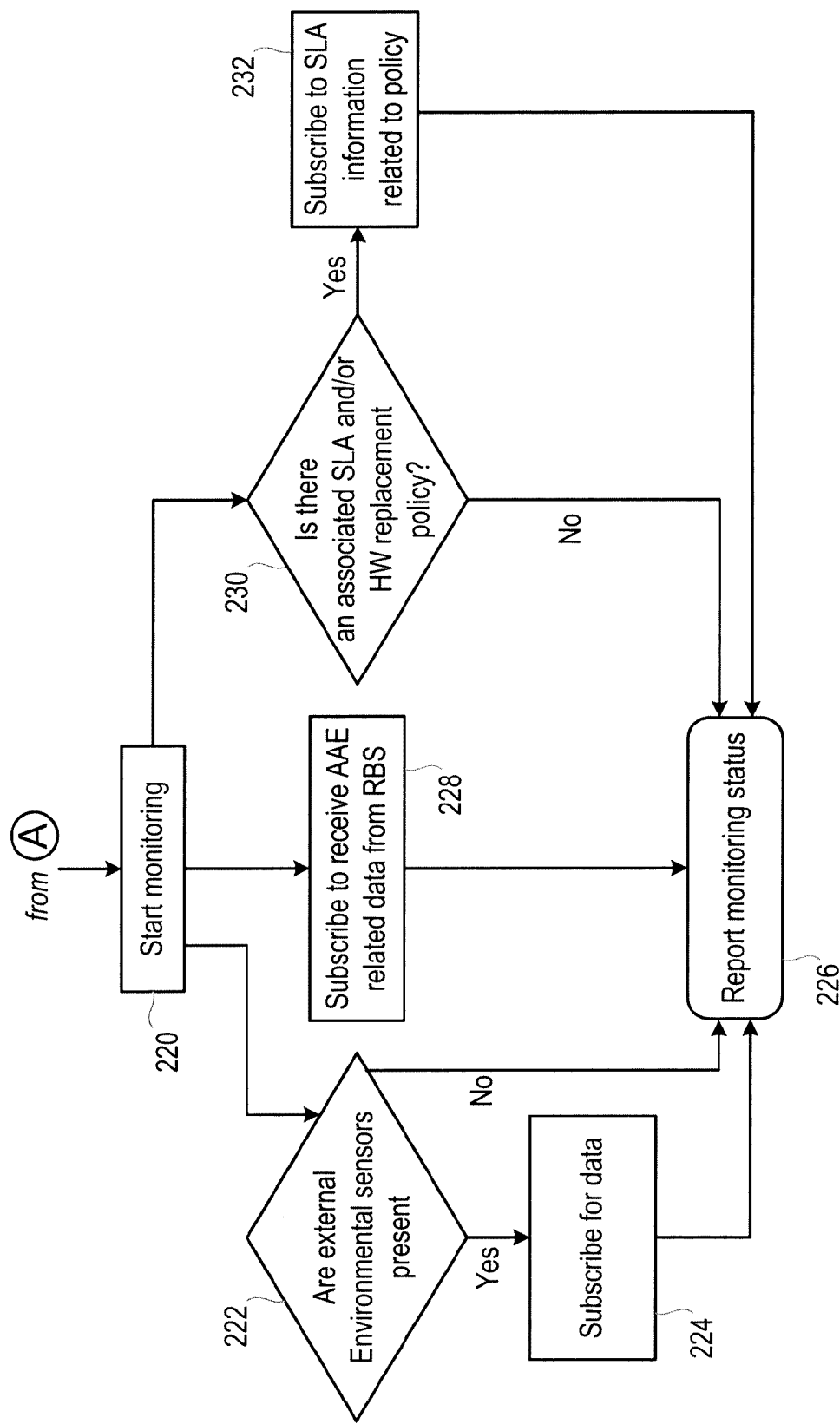
Figure 6A:
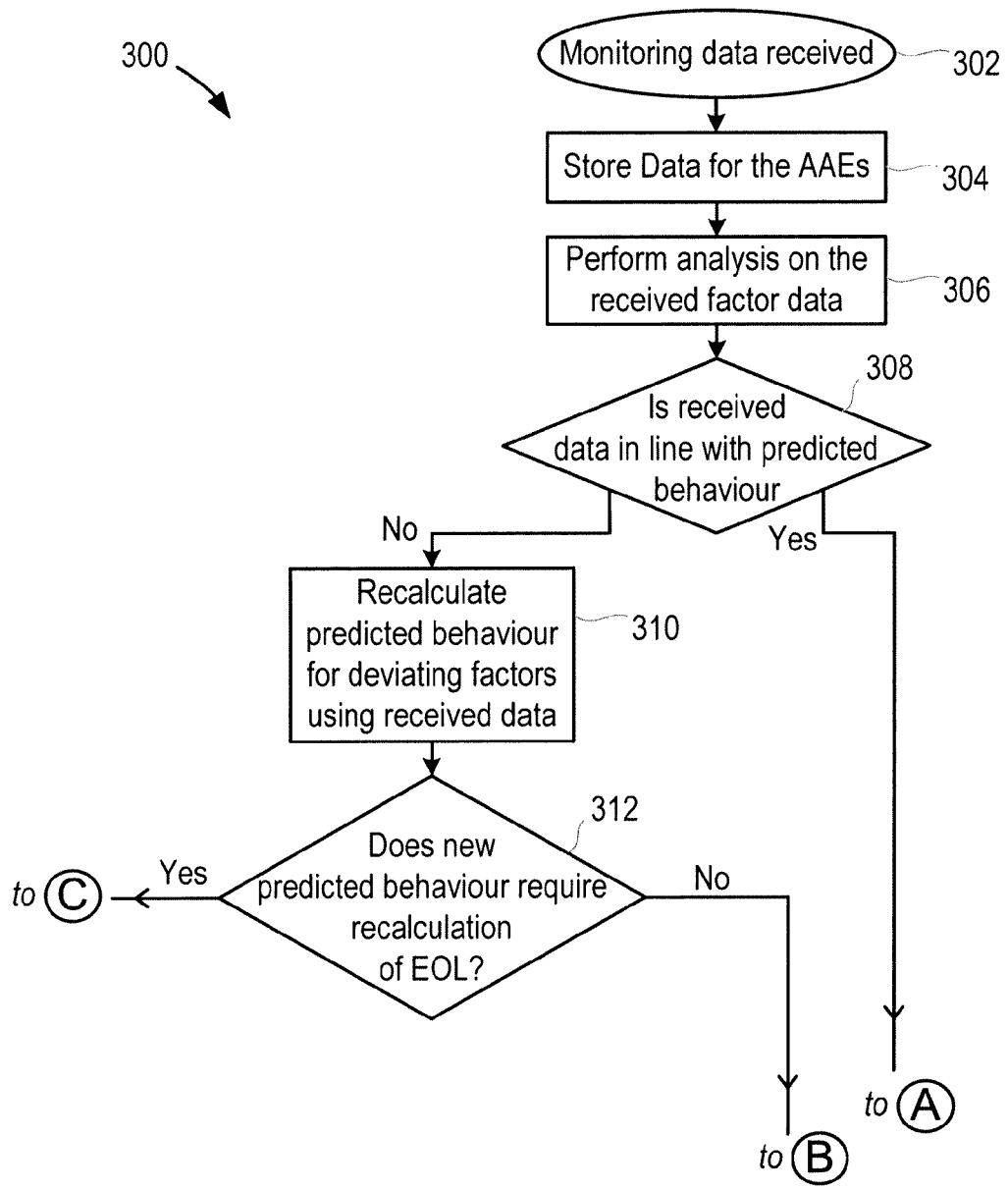
FIGS. 6a and 6b is a flow chart illustrating an example monitoring process for a node in a communication network, according to the method of FIG. 3.
Figure 6B:
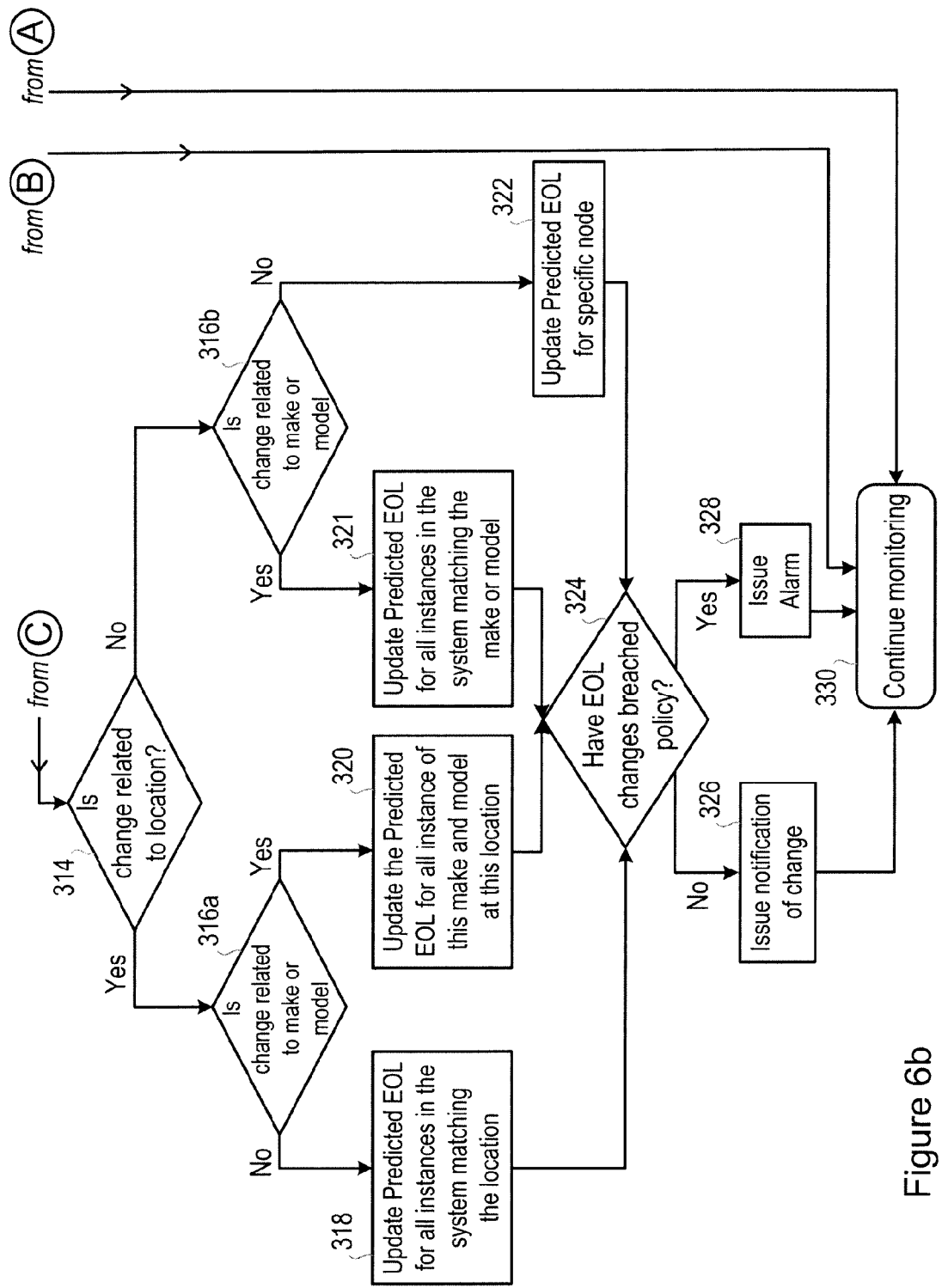
Figure 7A:
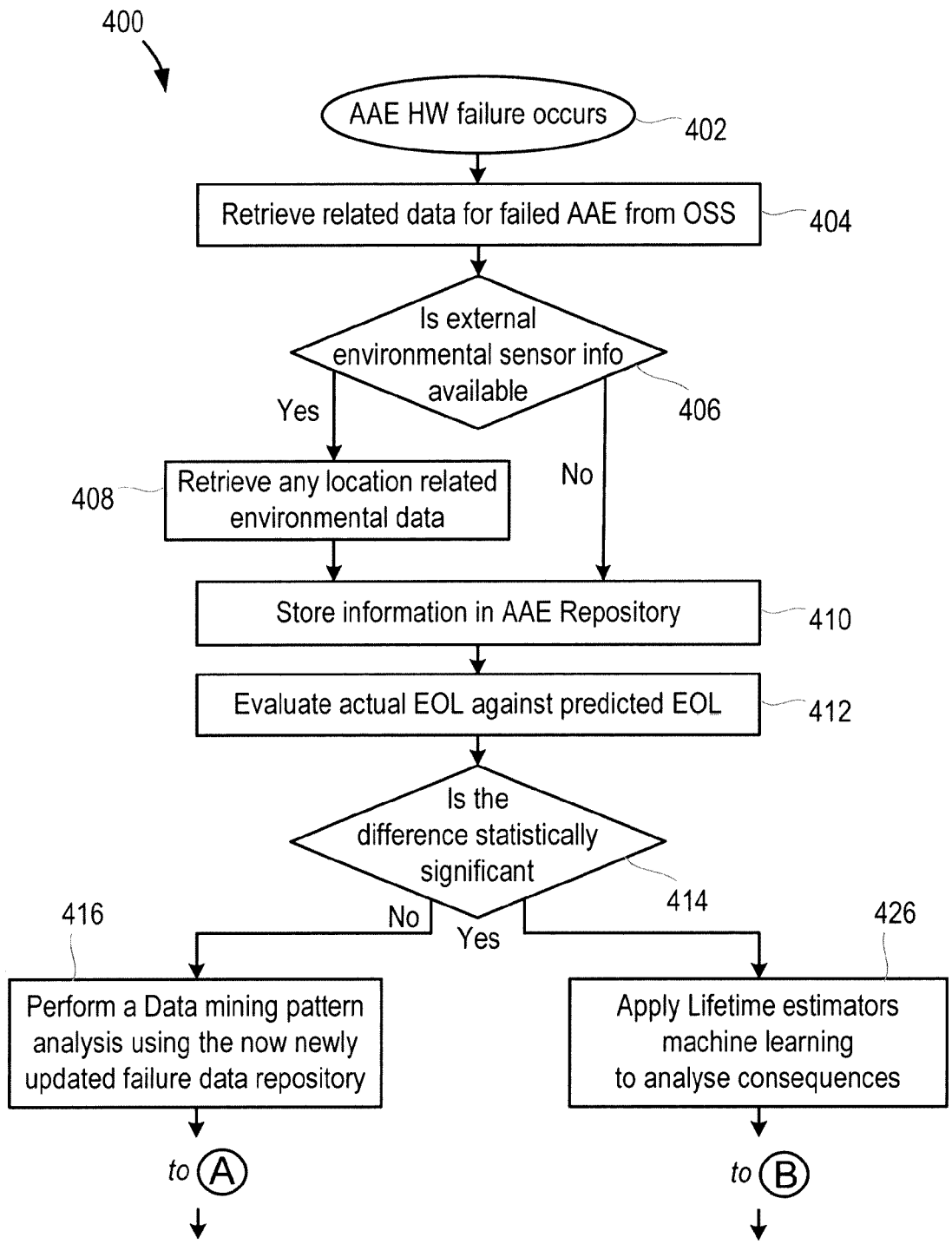
FIGS. 7a and 7b is a flow chart illustrating an example failure process for a node in a communication network, according to the method of FIG. 3.
Figure 7B:
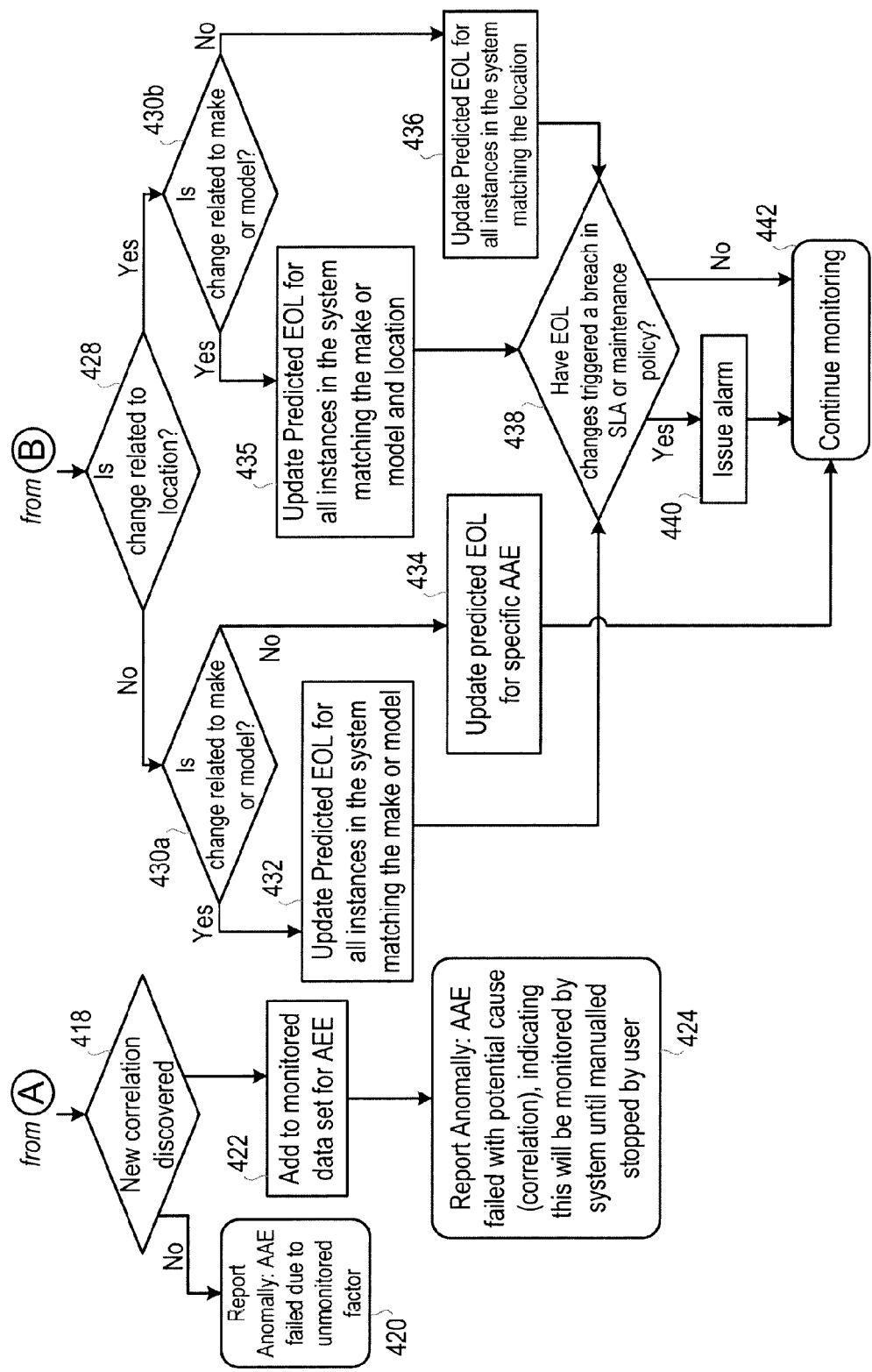

The method for predicting operational lifetime of a node illustrated in FIG. 3 may be implemented via a range of different process flows tailored to manage different stages in the operational lifetime of individual nodes. FIGS. 5, 6 and 7 illustrate example process flows implementing the method of FIG. 3 for the installation, ongoing monitoring and failure of AAEs in a DAS network. Together, the process flows of FIGS. 5, 6 and 7 illustrate one example of how the general method steps illustrated in FIG. 3 may be implemented in an example communication network. The process flows may be managed and coordinated via a managing network element such as a lifetime management server.

FIG. 5 illustrates a process flow for installation of a new AAE in a DAS network. On initiation of the method 20 for prediction of operational lifetimes for nodes in the DAS network, a catalogue of supported AAE equipment and the default manufacturer's estimated operational lifetime, or End Of Life (EOL) for the different makes and models supported in the network may be assembled. Maintenance schedules for the different locations covered by the DAS network, as well as Service Level Agreements (SLAs) and Hardware replacement policies for the users at the different locations may also be uploaded. Referring to FIG. 5, in a first step 202 of the process flow 200, a new AAE is installed and integrated into the network. The installation data for the new AAE is recorded at site in step 204. The installation data may include the make and model of the AAE installed, its geographic location, its postal address, for example the postal address of the building within which it is located, the time and date of the installation and the time and date of commissioning, if the associated Digital Unit and Indoor Radio Unit supporting the newly installed AAE are both operational at the time of installation. Installation data may be recorded from a variety of sources, including auto detection and issuance of a Configuration Management change report from the servicing Radio Base Station (RBS) and the recording by an installing technician of additional information in a handheld device (such as a Smartphone or tablet computer). The recorded data may be automatically transferred at step 206 to a central storage in or for a lifetime management server.

The new AAE is thus received at the lifetime management server in step 208 and the relevant manufacturer's information for the new AAE is fetched at step 210. A check is then made at step 212 to see if historical failure data for the make and model of the newly installed AAE is available within the operational lifetime server's memory, or if an existing AAE in the network of the same make and model has already had its default operational lifetime adjusted. If such data is available, it is fetched at step 214 and this data provides an enriched data set for the calculating, at step 216 of an initial predicted operational lifetime or EOL for the newly installed AAE. If no failure data or previous adjustment data is presently available for the make and model of the installed AAE, the default manufacturer's EOL for the installed AAE may be used as the initial predicted operational lifetime. Alternatively, in another example (not shown), historical failure data for nodes of a different make and model but installed in the same location as the newly installed AAE may be checked and taken into account in the calculating of the initial predicted EOL in step 216. If hardware failure data for the make and model of the new AAE is available, this may be used in calculating the initial predicted EOL for the installed AAE, adjusting the manufacturer's default according to experience with this particular make and model. Thus if the manufacturer's default has been found to be overly optimistic, the predicted operational lifetime for the newly installed AAE may be adjusted downwards. If an existing AAE in the network of the same make and model has already had its default operational lifetime adjusted, the newly installed AAE may have its default operational lifetime adjusted in the same manner.

Calculation of a predicted EOL may comprise applying a prediction algorithm on the basis of data obtained about the node and predicted operating and operating environment conditions for the node. A prediction algorithm may be developed on the basis of training data formed from monitored data and actual operational lifetimes of failed nodes.

Having calculated the initial predicted EOL for the newly installed AAE, this predicted EOL may be reported for storage at step 218 and monitoring of the newly installed AAE may begin at step 220. Monitoring may include, at step 222, checking whether external environmental sensors are present in the AAE's location and if so, subscribing to the data available from such sensors at step 224. Monitoring may also comprise subscribing, at step 228, to any or all data related to the AAE and available from the serving RBS. Monitoring may also comprise checking if an associated SLA and Hardware replacement policy for the location and user(s) of the newly installed AAE are available at step 230 and if so, subscribing to appropriate SLA and Hardware replacement policy information for the AAE 232. On completion of any or all of these monitoring tasks, the monitoring status of the AAE may be reported at step 226.

Once monitoring of an installed AAE has commenced, each incoming item of monitored data may be processed according to the process flow 300 of FIG. 6. Referring to FIG. 6, in a first step 302, monitored data is received for an AAE. This data may for example be operational data such as data rate or operating environment data such as a temperature reading for a location of the AAE. At step 304 the received data is stored and associated with the relevant AAE identifier and at step 306 the received data is analysed. The analysis of step 306 permits, at step 308 an assessment as to whether the received data is in line with predicted behaviour.

In order to assist with AAE monitoring, predictions may be made for an expected envelope of data readings for all monitored data for an AAE. These predictions may include monitored trends for operational environment or operating data, indicating for example, within a margin of variation, how the data rate, peak data rate, environment temperature etc varies through a typical time period of an hour, a day, a week etc. Received data may be checked against these predictions to see whether the received data is largely in line with predictions or represents a departure from predictions.

In order to reduce computational load in generating and maintaining predictions for monitored data, AAEs may be clustered according to their monitored data and/or predicted EOL and predicted variations of monitored data may be generated for each cluster. In order to cluster the AAEs, each AAE may be associated with its hardware data, monitored data and predicted EOL as AAE attributes. A clustering algorithm may then be run to group the AAEs in the network into clusters of similar AAEs or AAEs experiencing similar operational loads and operating environments. Maintaining a single set of predictions for each cluster, as opposed to each AAE individually, enables more efficient handling of data predictions and trends for what may be a very large number of individual AAEs. Step 308 may thus comprise checking the received data against the predicted trend for the cluster of which the relevant AAE is a part.

If the received data is found at step 308 to be in line with the predicted behaviour for AAE's cluster (or the individual AAE), the process flow may proceed directly to step 330 and continue monitoring, awaiting the next received data. If the received data is found at step 308 to be outside the predicted behaviour for the AAE's cluster (or the individual AAE), the process flow proceeds at step 310 to recalculate the predicted behaviour for the cluster (or AAE) taking account of the newly received divergent data. Once predicted behaviour is recalculated, a check is made to determine if the recalculated behaviour is sufficiently different from the previously predicted behaviour to require a recalculation of the predicted operational lifetime for the node. This may comprise performing a test recalculation of the predicted EOL for the node concerned on the basis of the new data predictions and checking to see whether and to what extent the predicted EOL has been impacted by the change in data predictions. If the EOL has changed by more than a threshold amount, for example more than a threshold percentage, it may be concluded that a recalculation of operational lifetime is required. If a recalculation of operational lifetime is not required on the basis of the new data prediction, the process flow proceeds directly to step 330 and continues monitoring, awaiting the next received data.

If at step 312 it is determined that the recalculated predicted behaviour is sufficiently different from the previously predicted behaviour to require a recalculation of the EOL for at least the relevant AAE, a check is then made at step 314 to determine if the change in predicted behaviour is related to the location of the AAE. This may be the case for example if the received data which prompted the change in predicted behaviour was a temperature change in the AAE environment. Such a change would be relate to the AAE location, although the change may also be related to the particular make or model of the AAE. If the change is found at step 314 to be related to the location of the AAE, a check is made at step 316a as to whether the change is also related to the make and model of the AAE. If, at step 316a, it is found that the change is not related to the make and model but only to location, then all other AAEs in the network having the same location and matching or corresponding monitored data are identified and their predicted operational lifetime recalculated on the basis of the new predicted behaviour at step 318. If the change in predicted behaviour is found to relate both to make and model and to location, then all AAEs in the same location and of the same make and model and having matching or corresponding monitored data are identified at step 320 and their operational lifetimes are recalculated according to the newly received data and newly calculated predictions. If at step 314, the change is found not to be related to the location of the AAE, a check is made at step 316b to determine if the change in predicted behaviour is related to the make and model of the AAE. This may be the case for example if the change is related to operational data, and to the handling of operational load by that particular make and model. If the change is found to be related to the make and model of the AAE, then all other AAEs in the network of the same make and model and having matching or corresponding monitored data are identified and their predicted operational lifetime recalculated on the basis of the new predicted behaviour at step 321, thus applying the insight gained from one monitored AAE to others experiencing the same operating conditions and which may be expected to respond in the same way to those conditions. If the change is found not to relate either to location or to make and model, then the change is considered an anomaly affecting only the reporting AAE, and the predicted operational lifetime for that specific AAE is updated at step 322.

Following the recalculation of operational lifetimes for AAEs at steps 318, 320, 321 or 322, a check is made at step 324 to determine whether or not the change in predicted operational lifetimes has caused a potential breach in SLA agreement or hardware replacement policy. For example, if a predicted operational lifetime has been reduced such that the relevant AAE is expected to fail shortly after the next scheduled maintenance visit, but the AAE is not scheduled for replacement until a subsequent visit, this might represent a breach of policy. If such a breach of policy is noted, an alarm is issued at step 328, allowing appropriate action to be taken. Appropriate action in the case of the present example may include identifying the relevant AAE for replacement at the next scheduled maintenance visit. If no policy breach is detected as a result of the changes in predicted operational lifetime for the AAE or AAEs, a notification of the change is issued at step 326 and the process flow continues with monitoring at step 330.

The method of FIG. 3, for example as implemented via the process flows of FIGS. 5 and 6 may enable the pre-emptive replacement of AAEs before failure occurs. However, failure of an AAE may occur unexpectedly or following a decision not to pre-emptively replace certain AAEs or categories of AAEs. FIG. 7 illustrates a process flow 400 enabling information learned from such failures to be fed back into the process for predicting operational lifetimes. Referring to FIG. 7, at step 402 an AAE hardware failure occurs. Following the failure, related monitored data for the failed AAE is retrieved at step 404 and a check is made for available external environmental sensors at step 406. If such sensors are available, their data is retrieved at step 408 and that information is stored along with the retrieved monitored data in step 410. The actual operational lifetime of the AAE is then compared, at step 412, to the predicted operational lifetime for the AAE. If a decision has been taken not to pre-emptively replace the AAE then the actual and predicted operational lifetimes may be very similar. However, it is possible that the actual and predicted operational lifetimes may be quite different, owing to some factor, monitored or unmonitored, that has not been accurately accounted for in the prediction process. The difference between predicted and actual operation lifetime may be calculated as a positive or negative magnitude or percentage value by which the predicted and operation lifetimes differ. If the calculated difference is within the acceptable margin of error, then the data is simply logged and monitoring continues (not illustrated). Long term evaluation of such logged data may be conducted to check for fine adjustments that could be made to the prediction algorithm to ensure that average actual operational life for AAEs that are not pre-emptively replaced is within an acceptable margin of the predicted operational life. If the calculated difference is greater than the acceptable margin of error, an assessment is made at step 414 as to whether the difference between actual and predicted operational lifetimes is statistically significant, that is whether the difference is likely to be caused by a factor related to monitored data which was taken into account in adjusting of the expected operational lifetime of the failed node, or by another, non-monitored factor. The assessment may be made on a threshold basis, with different thresholds for statistical significance being set depending on whether the actual operational lifetime was longer or shorter than the predicted operational lifetime:

for AAEs with an actual operational lifetime shorter than the predicted operational lifetime by more than the margin of error: Threshold 1 for AAEs with an actual operational lifetime longer than the predicted operational lifetime by more than the margin of error: Threshold 2.

If the difference between actual and predicted lifetime is not found to be statistically significant, it may be assumed that the difference was caused by a factor that was not taken into account in the prediction. In this case, the process flow conducts a data mining pattern analysis operation at step 416 using all available data for the failed AAE to attempt to identify a correlation at step 418 explaining the difference between actual and predicted operational lifetimes. If no new correlation is found, an anomaly is reported at step 420, indicating that the AAE has failed as a result of a factor which is not monitored. If a new correlation is fount at step 418, the associated data is added to the monitored data set for the AAE at step 422 and a different anomaly report is sent at step 424, indicating that the AAE has failed but also indicating a probable cause of failure and that the data associated with the probable cause will be monitored unless this monitoring is manually overridden.

If the difference between actual and predicted operational lifetimes is found to be statistically significant, this indicates that the difference was caused by a monitored factor. At step 426, the process flow evaluates the monitored data for the AAE and compares the monitored data to the data predictions used to calculate the predicted operational lifetime for the AAE. If the actual monitored data differs from the predicted data used to calculate estimated operational lifetime, then the data which differs may be identified as a key factor in element failure. If the monitored data is largely in line with the predicted data, then it may be appropriate to update the prediction algorithm by using the failed node as additional training data for refining the prediction algorithm to better reflect the correlation between monitored data and operational lifetime. In either case, the monitored data most closely associated with the cause of failure of the AAE may be identified.

The process flow then proceeds to identify whether the data most associated with the cause of failure (the data that differs from the predicted data or that corresponds to the failure cause) is related to location at step 428. If the data is related to location, a check is made at step 430*b* as to whether the data is also related to the make and model of the AAE. If, at step 430*b*, it is found that the change is not related to the make and model but only to location, then the predicted operational lifetime is updated for all AAEs within the network having the same location as the failed AAE and matching or corresponding monitored data at step 436. The updating may comprise re-running the established prediction algorithm on the basis of the new location related data which differed from predicted location related data, or running the newly refined prediction algorithm on the basis of the new location related data. If the data is found to relate both to make and model and to location, then the predicted operational lifetime is updated for all AAEs in the same location, of the same make and model and having matching or corresponding monitored data at step 435. As previously, this may comprise re-running the established prediction algorithm on the basis of the new data which differed from predicted data, or running the newly refined prediction algorithm on the basis of the new data.

If the data is found not to be related to the location of the AAE, a check is made at step 430*a* to determine if the data is related to the make and model of the AAE. If the data is found to be related to the make and model of the AAE, then the predicted operational lifetime is updated for all other AEEs in the network of the same make and model and having matching or corresponding monitored data at step 432. As previously, this may comprise re-running the established prediction algorithm on the basis of the new make and model related data which differed from predicted make and model related data, or running the newly refined prediction algorithm on the basis of the new make and model related data.

Following the recalculation of operational lifetimes for AAEs at steps 432, 435 and/or 436, a check is made at step 438 to determine whether or not the changes in predicted operational lifetimes have caused a potential breach in SLA agreement or hardware replacement policy. For example, if a predicted operational lifetime has been reduced such that the relevant AAE is expected to fail shortly after the next scheduled maintenance visit, but the AAE is not scheduled for replacement until a subsequent visit, this might represent a breach of policy. No such check is necessary following step 434 as the only AAE for which predicted operational lifetime has changed has already failed. If a breach of policy is noted at step 438, an alarm is issued at step 440, allowing appropriate action to be taken. Appropriate action may include identifying the relevant AAE for replacement at the next scheduled maintenance visit. If no policy breach is detected as a result of the changes to predicted operation lifetime for the AAE or AAEs, monitoring of the AAEs continues at step 442.

Each of the process flows illustrated in FIGS. 5, 6 and 7 represents an example implementation of the method of FIG. 3, in which historical failure data and monitored data for nodes are used to enable adjustment of an initial expected operational lifetime, for example by replacing it with a new predicted operational lifetime, generated by a prediction algorithm on the basis of monitored data for the node and optionally predicted monitored data for the node. As new failure instances occur, the insight gained from these failures is fed back into the prediction of operational lifetimes for the remaining nodes.

Figure 8:
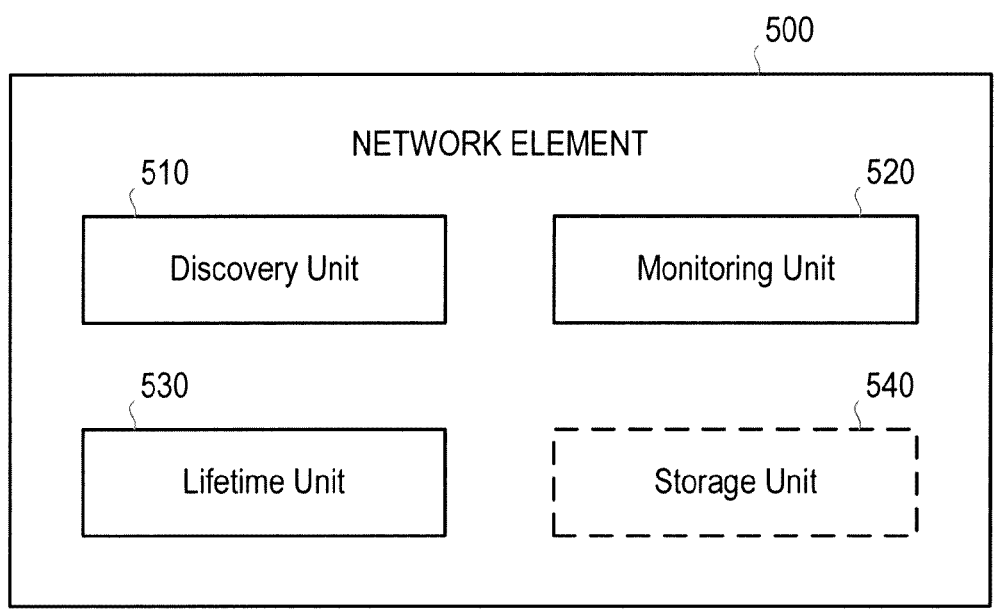
FIG. 8 is a block diagram illustrating a network element.

The method of FIG. 3 may be conducted by a network element. Apparatus for conducting the method of FIG. 3, for example on receipt of suitable computer readable instructions, may be incorporated within a network element such as a lifetime management server. FIG. 8 illustrates functional units in a network element 500 which may execute the steps of the method of FIG. 3, for example according to computer readable instructions received from a computer program. It will be understood that the units illustrated in FIG. 8 are functional units, and may be realised in any appropriate combination of hardware and/or software.

With reference to FIG. 8, the network element 500 comprises a discovery unit 510, a monitoring unit 520, a lifetime unit 530 and optionally a storage unit 540. The discovery unit 510 is configured to obtain an expected operational lifetime for a node, for example a default or previously predicted operational lifetime. The monitoring unit 520 is configured to monitor at least one of hardware identification data, operational data or operating environment data for the node. The lifetime unit 530 is configured to obtain historical failure data for nodes in the communication network having monitored data corresponding to the monitored data of the node, and to adjust the expected operational lifetime for the node according to the obtained historical failure data. The storage unit 540 is configured to store monitored data and adjusted expected operational lifetimes.

Figure 9:
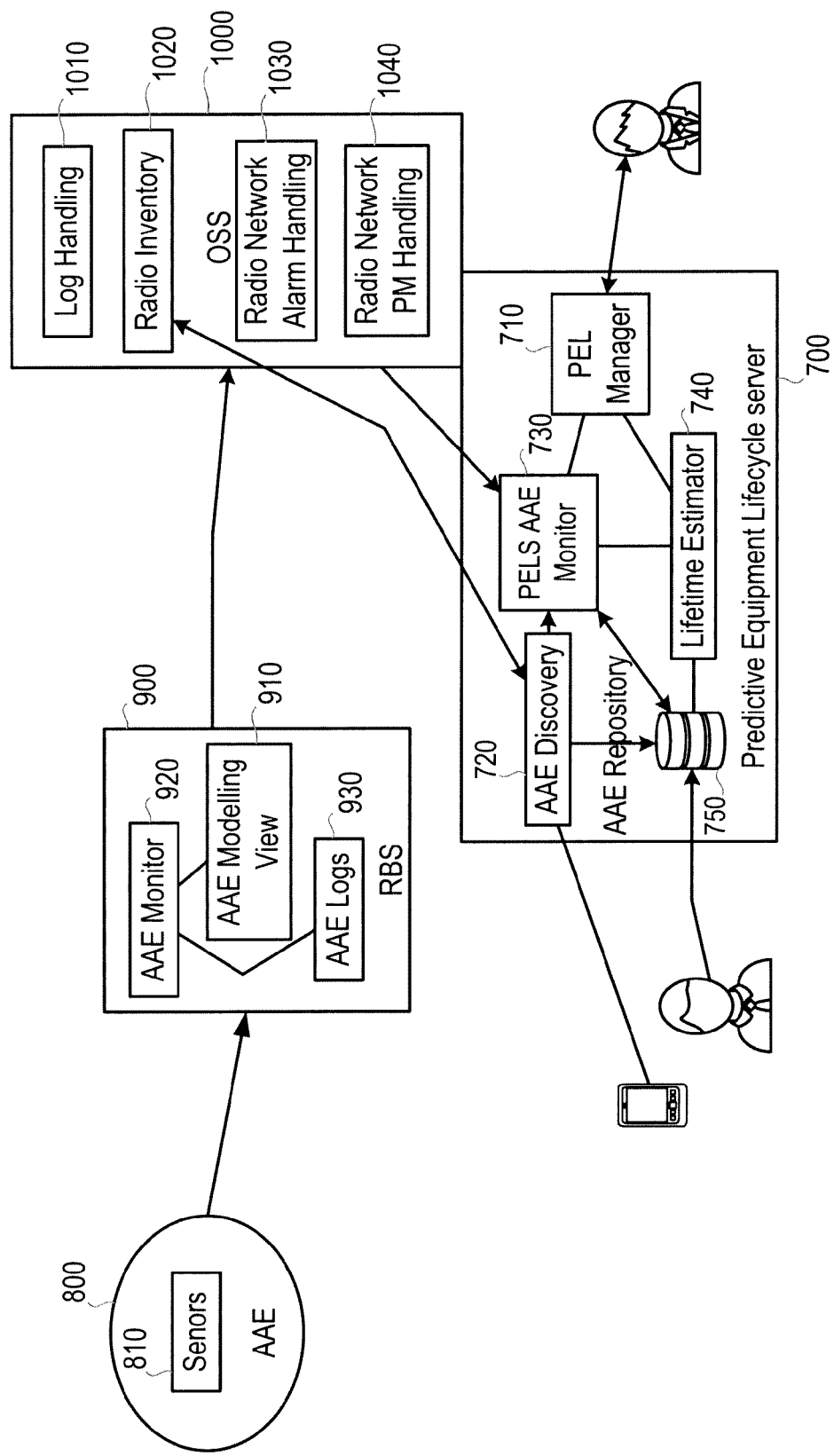
FIG. 9 is a functional overview of elements operable to execute a method according to FIG. 3.

FIG. 9 illustrates an example implementation of a network element configured to predict operational lifetimes, together with cooperating elements within a DAS and wider communication network. In the example of FIG. 9, the network element 500 is implemented as a Predictive Equipment Lifecycle Server (PELS) 700, which cooperates with an AAE and associated sensors 800, a Radio Base Station (RBS) 900, and an Operations Support System (OSS) 1000.

Referring to FIG. 9, a network operator uses a PEL manager 710 within the PELS 700 to upload location or customer specific SLA and Maintenance policies. An example maintenance policy might stipulate that no AAE failures are permissible and that location visits are conducted every 12 weeks. The PEL manager 710 displays SLA dashboards, alarms and statistical reports generated by the PELS 700.

The AAE 800 monitors its operating environment via the deployment of Sensors 810 (e.g. Temperature, Pressure, Power) alongside the Antenna electronics in the physical Antenna casing of the AAE 800. The AAE 800 has its product identity and serial number programmed into it at manufacture, and this is read by the RBS 900 on startup installation. An external environmental monitoring system may also be connected into the PELS 700 to enhance the location related data available to the server.

The RBS 900 has a model fragment 910 of the AAE 800 in its interface which is populated by an RBS AAE monitor 920. The RBS AAE monitor 920 supplies product information at startup and operational parameters while the AAE 800 is running. The RBS AAE monitor 920 receives all performance data, system events, and fault indications, some of which are logged in an AAE logs file 930, and others of which are forwarded to the AAE modeling view 910 to be sent to the OSS 1000 as alarms, counters, events or operational state change notifications.

AAE operational information is handled by the OSS components for log handling 1010, radio inventory 1020, radio network alarm handling 1030, and radio network PM handling 1040, which components then provide this information to interested subscribers on the North Bound Interface of the OSS.

The Predictive Equipment Lifecycle Server 700 has 5 illustrated components, the discovery unit, illustrated as AAE discovery 720, the monitoring unit, illustrated as PELS AAE Monitor 730, the lifetime unit, illustrated as lifetime estimator 740, the PEL manager 710 and the storage unit, illustrated as AAE repository 750. The AAE discovery 720 listens for incoming notifications from technicians installing AAEs at a site. This information is received from an AAE Installation Registration application on a Smartphone, tablet or laptop, or from updates to the AAE part of Radio Inventory data. The AAE discovery 720 stores new AAEs and their initial information into the AAE Repository 750.

The PELS AAE monitor 730 collects operational data for the AAE from the relevant OSS component and other systems. Data required for historical trending and prediction is stored in the AAE repository 750. The PELS AAE Monitor 730 also updates trend reports and predicted data for AAE clusters after receiving the new monitored data. The PELS AAE monitor 730 performs a call on the lifetime estimator 740 to check whether or not the received data from the OSS or the updated predictions should trigger a re-estimation the predicted lifetime of the AAE or other AAEs in the network. For example, if the AAE has seen a recent increase in frequency of voltage spikes, the new frequency of spikes may be discovered to be correlated with an earlier EOL than currently predicted for the AAE. A re-estimation may thus be triggered taking account of all current data for the AAE.

The lifetime estimator 740 performs statistical correlation and trending of the AAEs recorded operational data with a history of failures of similar AAE equipment, at a similar location, with similar operational characteristics. The lifetime estimator 730 also applies machine learning techniques to calculate the Predicted EOL for an AAE. As discussed above, this may comprise developing and applying a prediction algorithm using training data in the form of monitored input data and actual operational lifetime for previously failed AAEs in the network.

If a failure indication is received, the PELS AAE Monitor 730 requests all logs and historical information for the failed AAE from the OSS 1000 and stores the requested information in the AAE repository 750. The PELS AAE monitor 130 also triggers the Lifetime estimator 740 to perform re-analysis of key failure indicators for the type of AAE (using machine learning algorithms). If Lifetime estimator 740 detects new or changed triggers it may update the prediction model as well as updating rules for the AAE Monitor, and the EOL in the AAE repository for all AAEs that fit the relevant category.

In cases where a failure has occurred that cannot be explained based on the analysis of the history and trending of the measured factors, an anomaly is assumed in that failure has occurred as a consequence of a factor outside the set of monitored data. The Lifetime estimator 740 performs an analysis of the failure data to determine whether a new correlation can be identified. If a correlation is found then the PELS 700 automatically attempts to start monitoring the correlating factor for all AAEs. An alarm is issued to notify an operator that there has been an unexpected failure and providing the correlation information as probable cause, if available. The operator may then determine whether to continue monitoring the new factor, or to classify it as irrelevant and request the monitoring to be stopped. If no probable cause is provided the operator may decide to investigate further or take no further action.

The AAE Repository 750 may be initially populated and periodically updated with Manufacturer/Vendor supplied data specific to AAE operational lifetime, such as EMC or hardware testing results. Each update of AAE repository data triggers the PELS AAE Monitor 730 to update prediction and trends analysis and to potentially trigger Lifetime estimator 740 to recalculate predicted operational lifetimes.

The PEL Manager 710 may comprise a calculating unit and identifying unit configured to calculate a probability of operational lifetime of AAEs in the network falling within a time period and to identify nodes for which the probability of operational lifetime falling within the time period is above a threshold. This may allow an operator to take a decision as to pre-emptive replacement in accordance with the relevant SLA and hardware replacement policy.

Figure 10:
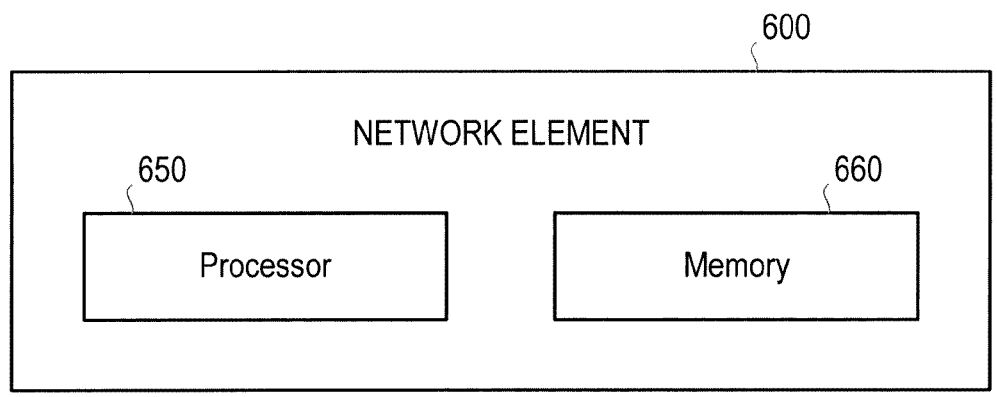
FIG. 10 is a block diagram illustrating another example of network element.

FIG. 10 illustrates another example of network element 600 which may be configured to conduct the method of FIG. 3. The network element 600 comprises a processor 650 and a memory 660. The memory 660 contains instructions executable by the processor 650 such that the processor 650 is operative to conduct the steps of the method of FIG. 3, for example as implemented by the process flows of FIGS. 5, 6 and/or 7.

Figure 11:
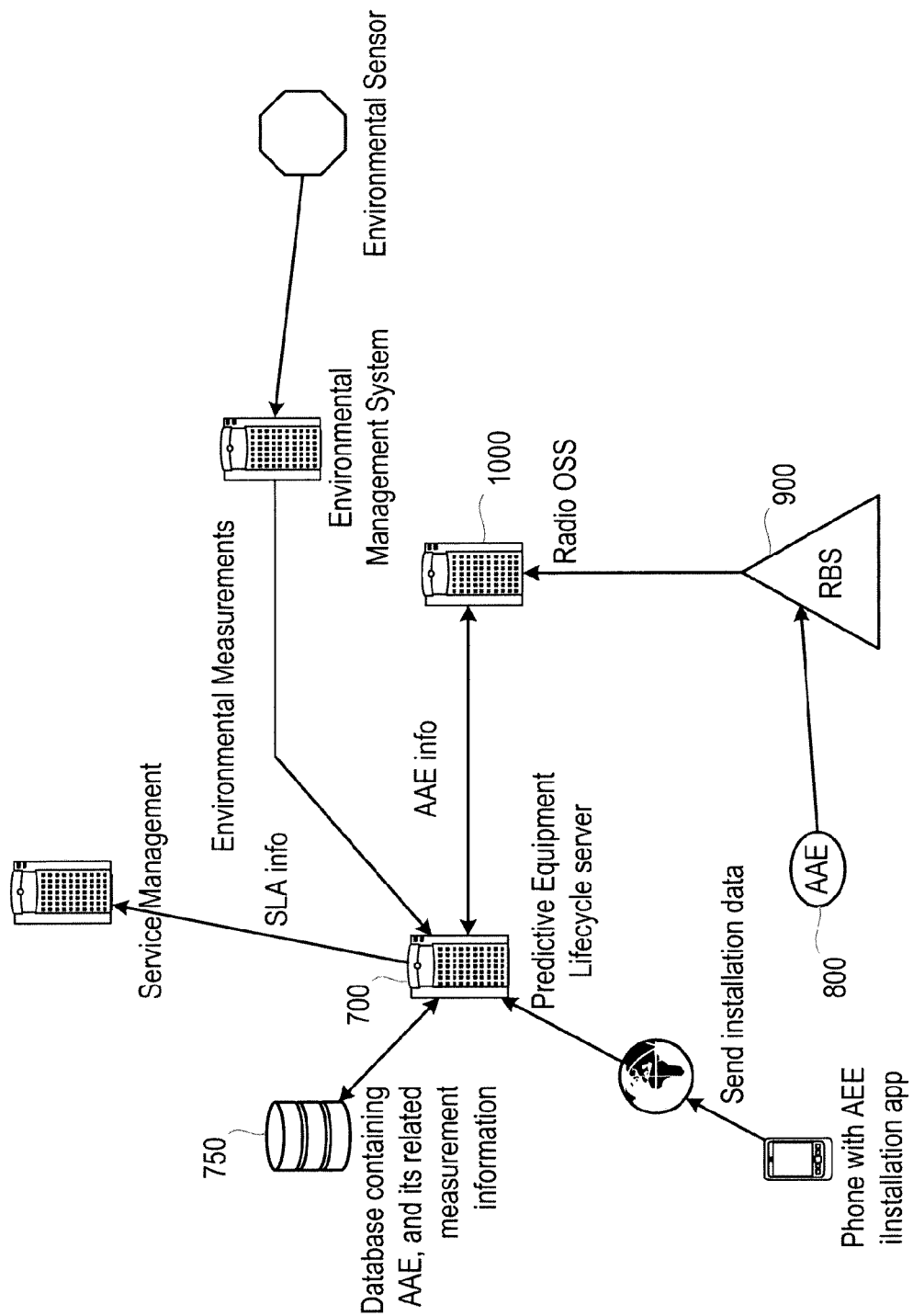
FIG. 11 is a diagram illustrating information flow according to an example method for predicting operational lifetime of a node in a communication network.

FIG. 11 provides a functional overview of information flow between examples of the various elements which may be involved in the prediction of operational lifetimes for AAEs in a DAS network. In the example elements of FIG. 11, the AAE repository 750 is located outside the PELS 700, with functional links between the two components. Referring to FIG. 11, information is received at the PELS 700 from installation equipment, environment servers via an environmental management system, and an AAE 800, via a radio base station 900 and a radio OSS 1000. Information is exchanged with radio OSS 1000 and with the AAE repository 750 and provided to service management, on the basis of which an operator may make operational decisions in line with hardware replacement and other policies.

Aspects of the present invention thus provide an accurate prediction of operational lifetime for nodes in a communication network. On the basis of such predictions, management of node lifecycle and decisions on pre-emptive replacement may be taken. The accurate predictions for node operational lifetime assist with management of operating expenses and the provision of guaranteed service levels in accordance with customer SLAs. The visibility of node operational lifetime and the way in which different makes and models behave under different environmental and operating factors may also provide useful intelligence for the sourcing of replacement equipment.

The methods of the present invention may be implemented in hardware, or as software modules running on one or more processors. The methods may also be carried out according to the instructions of a computer program, and the present invention also provides a computer readable medium having stored thereon a program for carrying out any of the methods described herein. A computer program embodying the invention may be stored on a computer-readable medium, or it could, for example, be in the form of a signal such as a downloadable data signal provided from an Internet website, or it could be in any other form.

It should be noted that the above-mentioned examples illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method for predicting operational lifetime of a node in a communication network, the method comprising:
   obtaining, by a processor of a network element, an expected operational lifetime for the node;
   monitoring, by the processor of the network element, at least one of hardware identification data, operational data or operating environment data for the node;
   obtaining, by the processor of the network element, historical failure data for a subset of nodes in the communication network having monitored data corresponding to the monitored data of the node; and
   adjusting, by the processor of the network element, the expected operational lifetime for the node according to the obtained historical failure data,
   wherein the method further comprising, on failure of a network node:
   determining a cause of the failure based on monitored data for the node; and
   calculating a disparity between actual operational lifetime of the failed node and expected operational lifetime of the failed node, wherein if the calculated disparity is above a threshold, identifying the monitored data corresponding to the determined cause of failure;
determining at least one of a location or a hardware data which is associated with the identified monitored data;
identifying nodes in the communication network sharing the determined location or hardware data; and
adjusting the expected operational lifetime for the identified nodes according to the identified monitored data.

2. The method as claimed in claim 1, wherein adjusting the expected operational lifetime for the node according to the obtained historical failure data comprises applying a machine learning algorithm to predict an expected operational lifetime for the node on the basis of an actual operational lifetime of nodes in the subset.

3. The method as claimed in claim 1, wherein the expected operational lifetime for the node comprises:
a default operational lifetime, or
a previously adjusted expected operational lifetime.

4. The method as claimed in claim 1, wherein operational data for the node comprises at least one of:
peak data rate;
average data rate;
power spikes; or
power interruptions.

5. The method as claimed in claim 1, wherein operating environment data for the node comprises at least one of:
average environment temperature; or
rate of change of environment temperature.

6. The method as claimed in claim 1, further comprising:
clustering nodes in the network according to monitored data; and
for each cluster, generating a predicted variation of each monitored data for nodes within the cluster.

7. The method as claimed in claim 1, further comprising, following adjustment of an expected operational lifetime for a node;
checking the adjusted expected operational lifetime against at least one of a Service Level Agreement or a Hardware Replacement Policy, and
signaling a breach of Service Level Agreement or Hardware Replacement Policy caused by the adjusted expected operational lifetime.

8. The method as claimed in claim 1, wherein the node comprises
an Active Antenna Element in a Distributed Antenna System.

9. A network element configured to predict operational lifetime of a node in a communication network, the network element comprising a processor and a memory, the memory containing instructions executable by the processor whereby the network element is operative to:
obtain, by a processor of the network element, an expected operational lifetime for the node;
monitor, by the processor of the network element, at least one of hardware identification data, operational data or operating environment data for the node;
obtain, by the processor of the network element, historical failure data for nodes in the communication network having monitored data corresponding to the monitored data of the node; and
adjust, by the processor of the network element, the expected operational lifetime for the node according to the obtained historical failure data
wherein, on failure of a network node, the processor of the network element is further operative to:
determine a cause of the failure based on monitored data for the node; and
calculate a disparity between actual operational lifetime of the failed node and expected operational lifetime of the failed node, wherein, if the calculated disparity is above a threshold, the network element is further operative to:
identify the monitored data corresponding to the determined cause of failure;
determine at least one of a location or a hardware data which is associated with the identified monitored data;
identify nodes in the communication network sharing the determined location or hardware data; and
adjust the expected operational lifetime for the identified nodes according to the identified monitored data.

10. The network element as claimed in claim 9, wherein the network element is further operative to:
adjust the expected operational lifetime for the node according to the obtained historical failure data by applying a machine learning algorithm to predict an expected operational lifetime for the node on the basis of an actual operational lifetime of nodes in the subset.

11. The network element as claimed in claim 9, wherein the network element is further operative to:
cluster nodes in the network according to monitored data; and
for each cluster, generate a predicted variation of each monitored data for nodes within the cluster.

12. The network element as claimed in claim 11, wherein, on receipt of monitored data for a node, the network element is further operative to:
store the received monitored data;
compare the received monitored data to the predicted variation for the node's cluster; and if the received monitored data is not within the predicted variation for the node's cluster:
adjust the predicted variation for the node's cluster according to the received monitored data; and
assess whether the change in predicted variation of monitored data will impact the expected operational lifetime of nodes within the cluster.

13. The network element as claimed in claim 12, wherein, if the assessment indicates that the change in predicted variation of monitored data will impact the expected operational lifetime of nodes within the cluster, the network element is further operative to:
determine at least one of a location or a hardware data which is associated with the received monitored data that was outside the predicted variation for the node's cluster;
identify nodes in the communication network sharing the determined location or hardware data; and
adjust the expected operational lifetime for the identified nodes according to the received monitored data.

14. The network element as claimed in claim 9, wherein, if the calculated disparity is not above a threshold, the network element is further operative to: perform pattern analysis on historical failure data for nodes including the failed node for data correlating with the failure of the node.

15. The network element as claimed in claim 9, wherein, following adjustment of an expected operational lifetime for a node, the network element is further operative to;
check the adjusted expected operational lifetime against at least one of a Service Level Agreement or a Hardware Replacement Policy, and signal a breach of Service Level Agreement or Hardware Replacement Policy caused by the adjusted expected operational lifetime.

16. An apparatus configured to manage replacement of nodes in a communication network, the apparatus comprising a processor and a memory, the memory containing instructions executable by the processor whereby the apparatus is operative to:

predict, by the processor of the apparatus, operational lifetime of the nodes in the communication network according to a method as claimed in claim 1;

calculate, by the processor of the apparatus, a probability of operational lifetime of nodes in the communication network falling within a time period; and identify, by the processor of the apparatus, nodes for which the probability of operational lifetime falling within the time period is above a threshold, whereby the processor of the apparatus is further operative to:

determine a cause of the failure based on monitored data for the node; and calculate a disparity between actual operational lifetime of the failed node and expected operational lifetime of the failed node, wherein, if the calculated disparity is above a threshold, the network element is further operative to:

identify the monitored data corresponding to the determined cause of failure;

determine at least one of a location or a hardware data which is associated with the identified monitored data;

identify nodes in the communication network sharing the determined location or hardware data; and adjust the expected operational lifetime for the identified nodes according to the identified monitored data.

\* \* \* \* \*